United States Patent [19]

Pieters

[11] 4,163,164

[45] Jul. 31, 1979

[54] SPLIT MAGNET DRIVE

[75] Inventor: Ferdinandus A. Pieters, Walnut Creek, Calif.

[73] Assignee: Micropump Corporation, Concord, Calif.

[21] Appl. No.: 841,034

[22] Filed: Oct. 11, 1977

[51] Int. Cl.² ............................................. H02K 7/11
[52] U.S. Cl. .................................................... 310/103
[58] Field of Search ............................... 310/103, 105

[56] References Cited

U.S. PATENT DOCUMENTS

| | | | |
|---|---|---|---|
| 1,862,267 | 6/1932 | Honig | 310/103 |
| 2,415,344 | 2/1947 | Eksergian | 310/103 |
| 3,240,304 | 3/1966 | Wickersham | 310/103 X |
| 3,374,375 | 3/1968 | Cook | 310/103 X |

*Primary Examiner*—Donovan F. Duggan
*Attorney, Agent, or Firm*—Julian Caplan

[57] ABSTRACT

One of two permanent magnets used to drive pumps and the like is split—i.e., the annular permanent magnet is split into two annular members, one fixed to one of the rotating members, the other freely rotatable independent of the other. The structure provides for recoupling without having to stop the driving magnet when decoupling has occurred. It also provides free travel and/or dynamic damping to alleviate oscillation and sporadic decoupling.

The member fixed for rotation is a permanent magnet; the other is preferably a permanent magnet but may also be of a material which is magnetically permeable, in which case damping only is accomplished.

10 Claims, 14 Drawing Figures

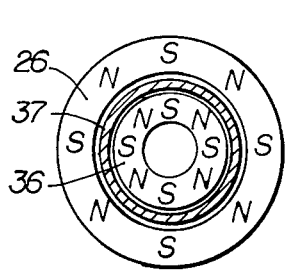
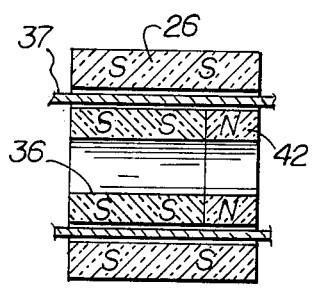
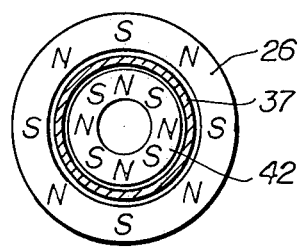
Fig.8  Fig.7  Fig.9
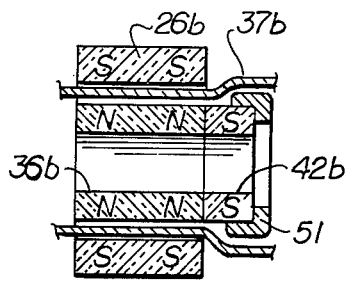
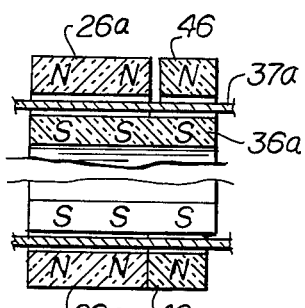
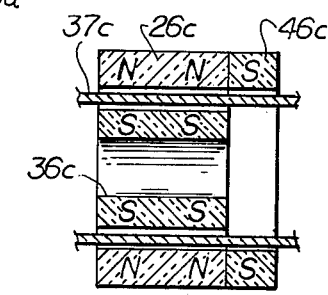
Fig.11  Fig.10  Fig.12
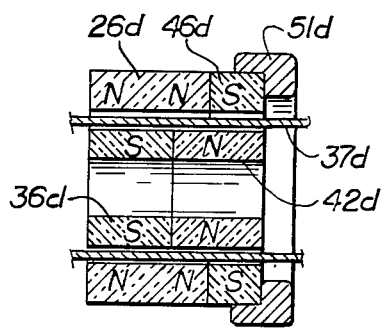
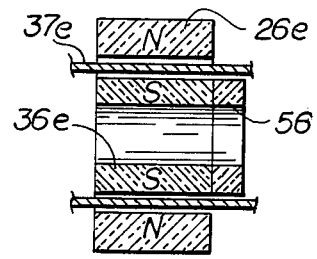
Fig.13  Fig.14

SPLIT MAGNET DRIVE

This invention relates to a new and useful improvement in magnetic drive, wherein one or both of the magnets are split. Heretofore magnetic drives have been used for a variety of purposes, one of the most important being the connection between an electric motor and a pump. Improvements in pump construction have resulted in higher torques being possible and also in the use of different types of electric motors which have resulted in problems of oscillation. The present invention is illustrated and described installed in a magnetically-driven gear pump. However, the principles of the invention are applicable in other environments.

It is characteristic of permanent magnet drive couplings that they tend to rotate pole-to-pole in a synchronous relationship. Torque transmission between the two magnets results in an angular displacement of one magnet relatively to the other to develop the tangential pull between the poles trying to stay together as they turn. Several malfunctions may result in normal operation of the drive:

A first malfunction is decoupling if the transmitted torque increases to the point where the tangential force at the poles exceeds the maximum magnetic pull available between the poles of the separate magnets. An angular jump will occur in the direction of the applied torque and the magnetic poles will realign themselves with the next adjacent poles and try to remain there. If the transmitted torque remains substantially the same, the adverse angular momentum of the jump will insure that the pole-jumping process will continue. The drive, for all practical purposes, is then decoupled. No net torque will be transmitted. The relative speed between the two magnets will increase. If the driving magnet is turning fast enough, the driven magnet will come to a complete stop and be unable to respond, except in fibrillation, to the driving magnet. The torque transfer at this point will be zero. To recouple the drive, both magnets must be brought to rest or at the same speed by other means. A principal purpose of the present invention is to enable recoupling of two magnets without bringing either to rest.

Another malfunction is oscillation. Since the tangential force exerted between the magnets is a function of the angular displacement between them, the drive constitutes a two-mass torsional vibrating system with substantially zero friction, hysteresis, or other damping effect. Therefore, there is always a natural frequency, depending on conditions, at which a torsional oscillation will occur between the two magnets. Almost any torsional disturbance that occurs at that frequency will cause oscillation or occur which, with substantially no damping, will increase in amplitude until decoupling occurs—even though the steady load on the coupling is far below the maximum torque it can transmit. Such torsional disturbances can occur once per revolution of the drive shaft, for a variety of reasons. Therefore, it is important that the shaft speed be remote from any natural frequency of the coupling—preferably above the natural frequency of the coupling. Sporadic decoupling can occur if the shaft speed is equal to or below this frequency. A principal object of the present invention is to provide both frictional and/or dynamic damping to alleviate oscillation and sporadic decoupling.

A further feature of the invention is the fact that the use of split magnets occasions only minor modification of standard magnetic drives structures.

A still further feature of the invention is the fact that the costs of parts and fabrication are relatively minor and maintenance costs are minimum.

Other objects of the present invention will become apparent upon reading the following specification and referring to the accompanying drawings in which similar characters of reference represent corresponding parts in each of the several views.

In the drawings:

FIG. 1 is a side elevational view broken away in section to reveal internal construction of a standard magnetic drive to which the present invention is applied.

FIGS. 2 and 3 are respectively transverse sectional views taken along the lines 2—2 and 3—3, respectively, of FIG. 1.

FIGS. 7, 8 and 9 are views similar to FIGS. 4, 5 and 6, respectively, showing the relationship of the magnets when substantial torque has been applied.

FIGS. 10, 11 and 12 are views similar to FIGS. 4, 5 and 6, respectively, showing the position of the magnets when torque has increased to the decoupling point.

FIG. 10 is a view similar to FIG. 4 showing the outer magnet rather than the inner magnet split.

FIG. 11 is a view similar to FIG. 4 showing the control magnet on the end of the inner or driven magnet and also showing extra mass applied to the control magnet.

FIG. 12 is a view similar to FIG. 11 showing the control magnet on the outer magnet.

FIG. 13 is a view similar to FIG. 12 showing extra mass applied to the outer control magnet and showing the inner magnets split.

FIG. 14 is a view similar to FIG. 11 showing a magnetically permeable ring rather than a magnet used as a control.

Figure 1:
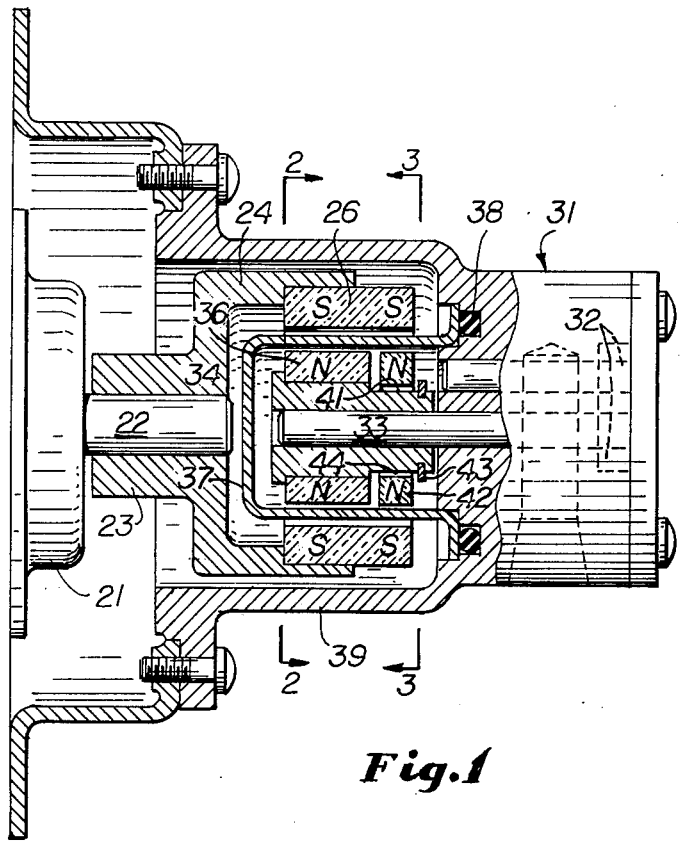

The pump shown in FIG. 1 is more or less schematic in the details of the pump structure, reference being had to U.S. Pat. No. 3,238,883 which illustrates one gear pump structure. It will be understood that many different types of magnetic drive installations are possible, both with pumps and with other driven instrumentalities.

In FIG. 1, motor 21 has a shaft 22 to which is connected hub 23 having a peripheral flange 24 in which is inset and attached a permanent annular magnet 26. Such magnets are commercially available and have various numbers of north and south poles. As here illustrated there are four north and four south poles, but this is a matter of design choice.

Pump 31, illustrated schematically, has gears 32 which form the means for pumping fluid, it being understood that many other types of pumps may be magnetically driven. One of the gears 32 has a shaft 33 which is elongated and carries on its end a magnet holder 34 to which is fixed an inner magnet 36 similar to but smaller than magnet 26. As here shown, the number of north and south poles in magnet 36 is the same as in magnet 26 but this again is a matter of design choice. Separating the space between the magnets 26 and 36 is a cup-shaped separator 37 which is sealed to the body of pump 31 by means of seal 38 or other means. A bell 39 holds motor 21 and pump 31 in alignment and in proper spaced relation.

In conventional motor driven magnetic drive pumps, rotation of shaft 22 causes the drive magnet 26 to turn and by reason of the attraction of the magnets, causes magnet 36 to turn at the same rate, thereby turning shaft 33 and turning the gears 32 to pump fluid. In such pumps it is customary for the magnet 36 to be of the same length in an axial direction as magnet 26, but again this is a matter of design choice.

In accordance with the present invention, a control or second magnet 42 is used which is not fixed to the holder 34 as is the magnet 36. In the embodiment shown in FIG. 1, a neck 41 is formed on the right hand end of holder 34 and the inside diameter of the annular magnet 42 is sufficiently greater than the diameter of neck 41 so that it can turn independently of shaft 33 and of magnet 36. In this embodiment, the number of north and south poles in the magnet 42 is the same as in the magnets 26 and 36, but this is a matter of design choice. A retainer 43 may be installed on neck 41 to limit movement of magnet 42 to the right as shown in FIG. 1. Further, to prevent binding between the holder 34 and magnet 42 there is a gap 44.

Magnet 42 is free to float and rotate at will, being constrained only as to the limits of its travel in order to keep the various parts together within their normal region of operation.

Figure 3:
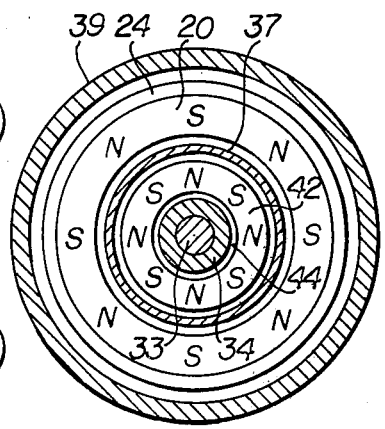
Figure 2:
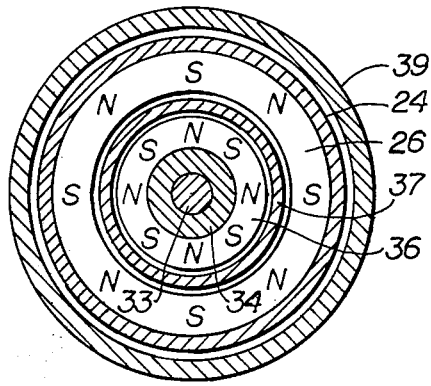

As illustrated in FIGS. 1-3, with low torque, the drive is coupled and the magnetic poles are all aligned south to north in a radial direction for driving, but the control magnet 42 is forced into an angular position wherein the north poles of the magnets 36 and 42 are opposite each other in an axial sense and repel each other in the axial direction. Thus the control magnet 42 floats to the right, free and clear of all restraint and rotates with the outer driving magnet 26.

Figure 5:
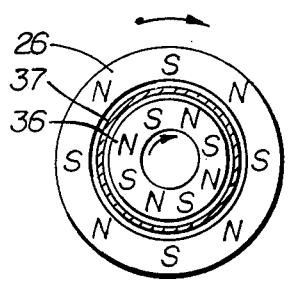
FIGS. 5 and 6 are end views from the left and right of FIG. 4, respectively.
Figure 4:
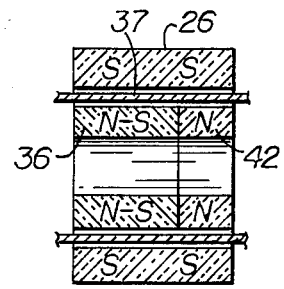
FIG. 4 is a schematic view of the magnetic drive with low torque application.
Figure 6:
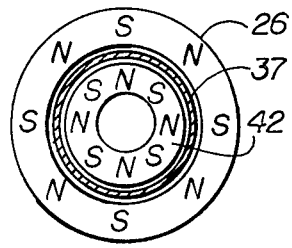

As more torque is applied to the drive, driven magnet 36 rotates with respect to driving magnet 26 to assume the load, but the control magnet 42 does not so rotate (contrast FIG. 5 with FIG. 6). The control magnet 42 is no longer repelled by inner magnet 36 and is able to move into face-to-face contact with magnet 36.

Directing attention now to FIGS. 7-9, if torque is increased to the decoupling point, the positions are such that the south poles of magnet 36 are opposite the south poles of magnets 26, but the north poles of magnet 42 are opposite the south poles of magnet 26. Contrast FIGS. 8 and 9. The driven magnet 36 is in position for zero torque transmission with respect to magnet 26 and with like poles repelling on "dead center". The control magnet 42, however, is still in its normal or coupled position as to poles with the driving magnet. Thus the poles of magnets 42 are aligned north to south with the driven magnet 36 and it is strongly attracted to it, causing mechanical friction as well as magnetic torque in the direction of rotation of magnet 26. The mechanical friction as well as magnetic torque of magnet 42 relative to magnet 36 may not prevent subsequent decoupling of the magnet 36 relative to magnet 26, but if the torque load on magnet 36 is somewhat reduced after decoupling, the rotational drag from the rotating control magnet 42 applied to the decoupled magnet 36 applied repeatedly at the precise instant when the poles of the magnet 36 go over "dead center" with respect to the poles of magnet 26, will cause the decoupled magnet 36 to begin to rotate again. As it picks up speed, it will develop more torque and suddenly jump into synchronism with magnet 26. Thus recoupling is accomplished automatically without having to stop the rotation of magnet 26.

If oscillation of the drive should occur, the action of control magnet 42 is again brought into play. If the amplitude of the oscillation is serious enough to invite decoupling from this cause, control magnet 42 moves into frictional contact with the oscillating driven magnet 36 at the extremes of the oscillatory travel, introducing significant damping friction to delay or eliminate sporadic decoupling from this source.

The foregoing is an important contribution to the solution of problems of magnetic drives which, so far as the inventor is concerned, has never heretofore been accomplished.

Turning attention now to FIG. 10, the outer magnet 26a can be split and control magnet 42 can be positioned next thereto. The inner magnet 36a is elongated and has an axial length approximately equal to the sum of the lengths of magnets 26a and 42. In the upper half of FIG. 10 the magnets correspond in position to that of the magnets in FIG. 1, whereas in the lower half of FIG. 10 the magnets correspond in position to that of FIG. 7. In the arrangement of FIG. 10, the inner magnet is the driver magnet and the outer magnet the driven magnet.

FIG. 11 illustrates another configuration of the split magnet drive which may or may not have recoupling capability. In this arrangement the control magnet 42b is less influenced by the driving magnet 26b and remains in frictional contact with the driven magnet 36b while the drive is coupled. By designing the mass of magnet 42b and the spring action between its poles and the poles of the driven magnet 36b to properly attract one another, control magnet 42b is capable of acting both as a friction damper and as a dynamic damper at the same time. Low amplitude oscillation of magnet 36b will not be followed by the loose control magnet 42b, and significant friction between them will come into play to dissipate the oscillatory energy build-up with time which ordinarily results in decoupling at torque much lower than the maximum capacity of the drive. However, if the amplitude of oscillation should increase despite friction, then the angular pull of the poles will cause the control magnet 42b to oscillate also. Such oscillation, however, will be out of phase with that of the magnet 36b and dynamic damping will occur in addition to friction. To augment oscillation damping, an extra mass indicated generally by reference numeral 51 may be fixed to the magnet 42b somewhat in the manner of a fly wheel.

Directing attention to FIG. 12, the control magnet 46c can be associated with outer magnet 26c, regardless of whether the magnet 26c or the inner magnet 36c is the driving magnet.

FIG. 13 illustrates that control magnets 42d and 46d can be associated both with the inner magnet 36d and the outer magnet 26d. For damping, an added mass 51d may be applied to the magnet 46d or (as not shown, but readily understood) the extra mass may be applied to the magnet 42d. Alternatively, one of the control magnets 42d or 46d may be locked in place with its associated magnet to provide drive characteristics suitable for a particular application.

FIG. 14 shows still a further modification wherein the member 56 is not a magnet but is an annular magnetically permeable member such as iron of the type used in armatures. In the structure of FIG. 14, only damping occurs. There is only mechanical friction between ring 56 and magnet 36e. It will be understood that instead of the damping armature being applied to the inner magnet 36e it may be applied to the outer magnet 26e.

In many of the modifications illustrated herein there are identical parts and accordingly the same reference numerals a, b, c, d and e applied indicate corresponding parts in FIGS. 10, 11, 12, 13 and 14, respectively.

What is claimed is:

1. A magnetic drive comprising an annular first magnet, an annular second magnet in driving proximity to said first magnet, drive means for driving said first magnet, drive means driven by said second magnet, and an annular control member in proximity to one of said magnets, said control member being independent of rotation of said driven means, said control member having at least one position of movement when said control magnet is in frictional contact with one of said magnets, said first and second magnets each having a plurality of magnetic poles.

2. A drive according to claim 1 in which said control member is magnetically permeable.

3. A drive according to claim 1 in which said control member is a magnet having a plurality of poles.

4. A drive according to claim 3 in which said control member is axially aligned and in proximity to said second magnet.

5. A drive according to claim 4 in which both said second magnet and said control member are inside said first magnet and magnetically attracted by said first magnet, said control member being axially movable toward and away from said second magnet.

6. A drive according to claim 4 in which said control member is remote from magnetic influence by said first magnet but is in frictional contact with said second magnet.

7. A drive according to claim 6 which further comprises non-magnetizable mass rotatably connected to said control member, said control member being positioned to frictionally dampen said second magnet.

8. A drive according to claim 1 in which said control member is a magnet in frictional contact with said one of said magnets but remote from magnetic influence by the other of said magnets.

9. A drive according to claim 8 which further comprises an annular second control member, said second control member being a multi-pole magnet in frictional contact with said other of said magnets but remote from magnetic influence by the said one of said magnets.

10. A drive according to claim 9 which further comprises a mass rotatably connected to one of said control members, each said control member being positioned to frictionally dampen one of said magnets.

* * * * *